United States Patent
Kikuchi

(10) Patent No.: US 11,914,654 B2
(45) Date of Patent: Feb. 27, 2024

(54) DOCUMENT MANAGEMENT APPARATUS, DOCUMENT MANAGEMENT SYSTEM, AND NON-TRANSITORY COMPUTER READABLE MEDIUM STORING PROGRAM

(71) Applicant: FUJIFILM Business Innovation Corp., Tokyo (JP)

(72) Inventor: Kaori Kikuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 419 days.

(21) Appl. No.: 16/891,082

(22) Filed: Jun. 3, 2020

(65) Prior Publication Data
US 2021/0149967 A1  May 20, 2021

(30) Foreign Application Priority Data
Nov. 15, 2019  (JP) .................................. 2019-206772

(51) Int. Cl.
*G06F 16/93* (2019.01)
*G06F 40/123* (2020.01)
*G06F 40/169* (2020.01)

(52) U.S. Cl.
CPC ............ *G06F 16/93* (2019.01); *G06F 40/123* (2020.01); *G06F 40/169* (2020.01)

(58) Field of Classification Search
CPC .... G06F 40/169; G06F 3/04842; G06F 16/93; G06F 40/123
See application file for complete search history.

(56) References Cited

U.S. PATENT DOCUMENTS

| | | | | |
|---|---|---|---|---|
| 7,028,253 | B1* | 4/2006 | Lieberman | G06F 16/58 |
| | | | | 707/E17.026 |
| 8,701,001 | B2* | 4/2014 | Dovey | G06F 9/451 |
| | | | | 715/204 |
| 9,282,289 | B2* | 3/2016 | Alexandrov | G06Q 10/10 |
| 9,372,843 | B2 | 6/2016 | Numata | |
| 9,436,659 | B2* | 9/2016 | Duns | G06F 40/169 |
| 2007/0015118 | A1* | 1/2007 | Nickell | G09B 7/02 |
| | | | | 434/118 |
| 2008/0256114 | A1* | 10/2008 | Rasmussen | G06F 40/123 |
| | | | | 707/999.102 |

(Continued)

FOREIGN PATENT DOCUMENTS

| JP | H0863465 | 3/1996 |
|---|---|---|
| JP | H08161347 | 6/1996 |
| JP | 2003006186 | 1/2003 |

(Continued)

OTHER PUBLICATIONS

"Notice of Reasons for Refusal of Japan Counterpart Application", dated May 23, 2023, with English translation thereof, p. 1-p. 6.

*Primary Examiner* — Wilson W Tsui
(74) *Attorney, Agent, or Firm* — JCIPRNET

(57) ABSTRACT

A document management apparatus includes a display control unit that performs control to display a first document and a second document, a comment reception unit that receives a comment to be added to a part of the first document displayed by the display control unit, and an association unit that associates a part of the second document that is a basis of the comment received by the comment reception unit with the comment.

9 Claims, 13 Drawing Sheets

(56) References Cited

U.S. PATENT DOCUMENTS

2012/0216102 A1* 8/2012 Malla .................... G06F 40/169
715/206
2015/0120840 A1* 4/2015 Rostocil, Jr. ........ H04L 65/4015
709/206

FOREIGN PATENT DOCUMENTS

| JP | 2010170438 | 8/2010 |
| JP | 2014021508 | 2/2014 |

* cited by examiner

DOCUMENT MANAGEMENT APPARATUS, DOCUMENT MANAGEMENT SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-206772 filed Nov. 15, 2019.

BACKGROUND

(i) Technical Field

The present invention relates to a document management apparatus, a document management system, and a non-transitory computer readable medium storing a program.

(ii) Related Art

JP1996-161347A discloses an information file link generation system that supports linking between information files in a case where an information update process in which updating of a certain information file requires updating of another information file is performed on a plurality of information files, in which in a case where the information file is edited, a name of a reference information file that is referenced in the past is recorded in a memory device together with the reference time, in a case where the editing of the information file ends and a linking operation between the information file and another information file, the reference information file name recorded in the memory device within a time range selected by a creator is presented to the creator, and the edited information file name is recorded in a link data section of the reference information file selected by the creator.

JP2010-170438A discloses a document management system that manages a plurality of electronic documents, the system including a storing unit that stores the plurality of documents, a searching unit that searches a predetermined document according to an instruction of a user, an editing unit that edits the searched document according to the instruction of the user, a unit that causes the storing unit to re-store the edited document a detection unit that detects a search for another document by the searching unit from when the document is searched until the document is re-stored, and a unit that associates the other document that is detected with the re-stored document and causes the storing unit to store the associated documents.

JP2014-021508A discloses an information processing apparatus including a document storing unit that stores one or more electronic documents each including a plurality of elements, a reference operation reception unit that displays a first element group in the electronic document stored in the document storing unit on a screen and receives a reference operation with respect to one or more elements in the first element group, an editing operation reception unit that displays a second element group in the electronic document stored in the document storing unit on the screen and receives an editing operation with respect to one or more elements in the second element group, an operation storing unit that stores information of the received operation, and an association unit that associates the target element of the reference operation in the first element group with the target element of the editing operation in the second element group based on the operation storing unit, in a case where the reference operation reception unit receives the reference operation with respect to one or more elements in the first element group, and then the editing operation reception unit receives the editing operation with respect to one or more elements in the second element group.

SUMMARY

Aspects of non-limiting embodiments of the present disclosure relate to a document management apparatus, a document management system, and a non-transitory computer readable medium storing a program that can clarify a basis for adding a comment in a case where the comment is added to a part of a document.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a document management apparatus includes a display control unit that performs control to display a first document and a second document, a comment reception unit that receives a comment to be added to a part of the first document displayed by the display control unit, and an association unit that associates a part of the second document that is a basis of the comment received by the comment reception unit with the comment.

The document refers to a material represented by a text, a symbol, a graphic, an image, or a combination thereof, and is an electronic document. Examples of the document include a source code, an e-mail, a chat content, and a web page in addition to a formal general document represented by the text.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to drawings.

Figure 1:
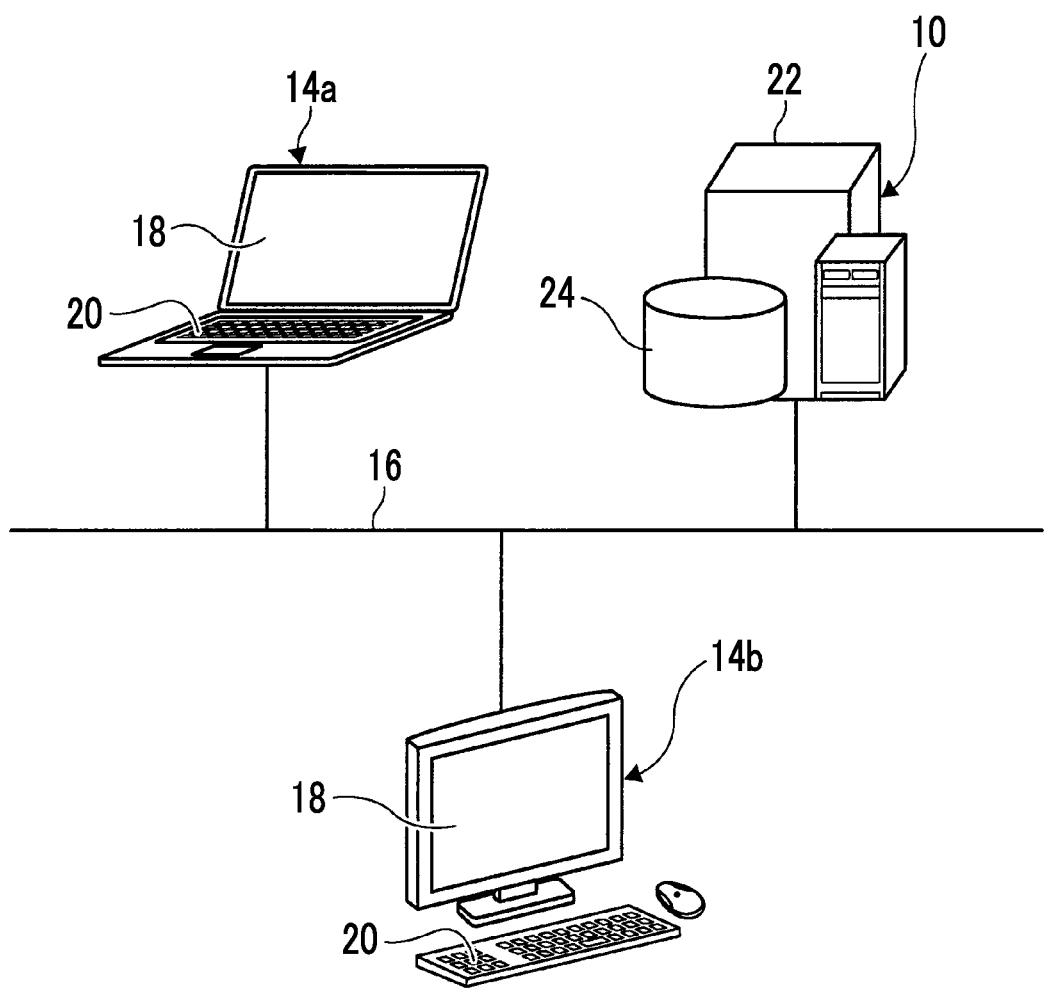
FIG. 1 is a block diagram showing a document management system according to an exemplary embodiment of the invention.

FIG. 1 shows an entire document management system 12 having a document management apparatus 10 according to the exemplary embodiment of the present invention.

In the document management system 12, terminal apparatuses 14a and 14b such as a personal computer are connected to each other via a network 16. The terminal apparatuses 14a and 14b include a display device 18 such as a liquid crystal display and an input device 20 such as a keyboard or a mouse. The network 16 maybe a local area network or the internet.

The document management apparatus 10 includes a server 22 and a database 24 that is a large capacity storage device. The database 24 stores a number of documents.

Figure 2:
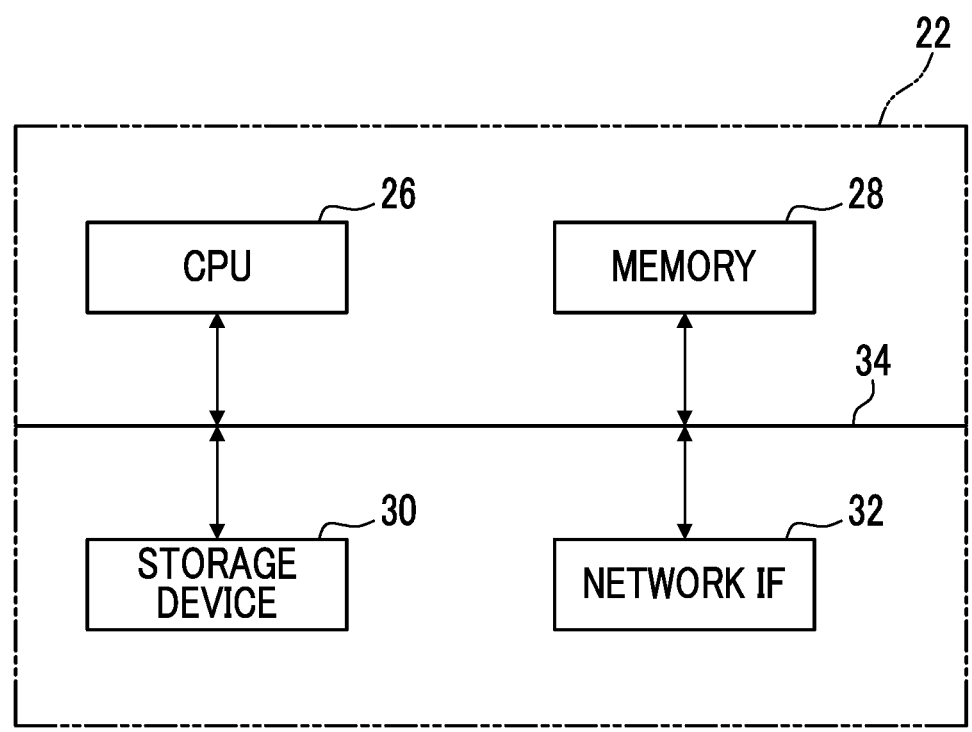
FIG. 2 is a block diagram showing a hardware of a document management apparatus according to the exemplary embodiment of the invention.

As shown in FIG. 2, the server 22 includes a CPU 26, a memory 28, a storage device 30, and a network interface 32, and the CPU 26, the memory 28, the storage device 30, and the network interface 32 are connected to each other via a bus 34.

The CPU 26 executes predetermined processing based on a control program stored in the memory 28. The storage device 30 is configured by, for example, a hard disk, and stores the necessary software or data. The network interface 32 inputs and outputs data via the network 16.

Figure 3:
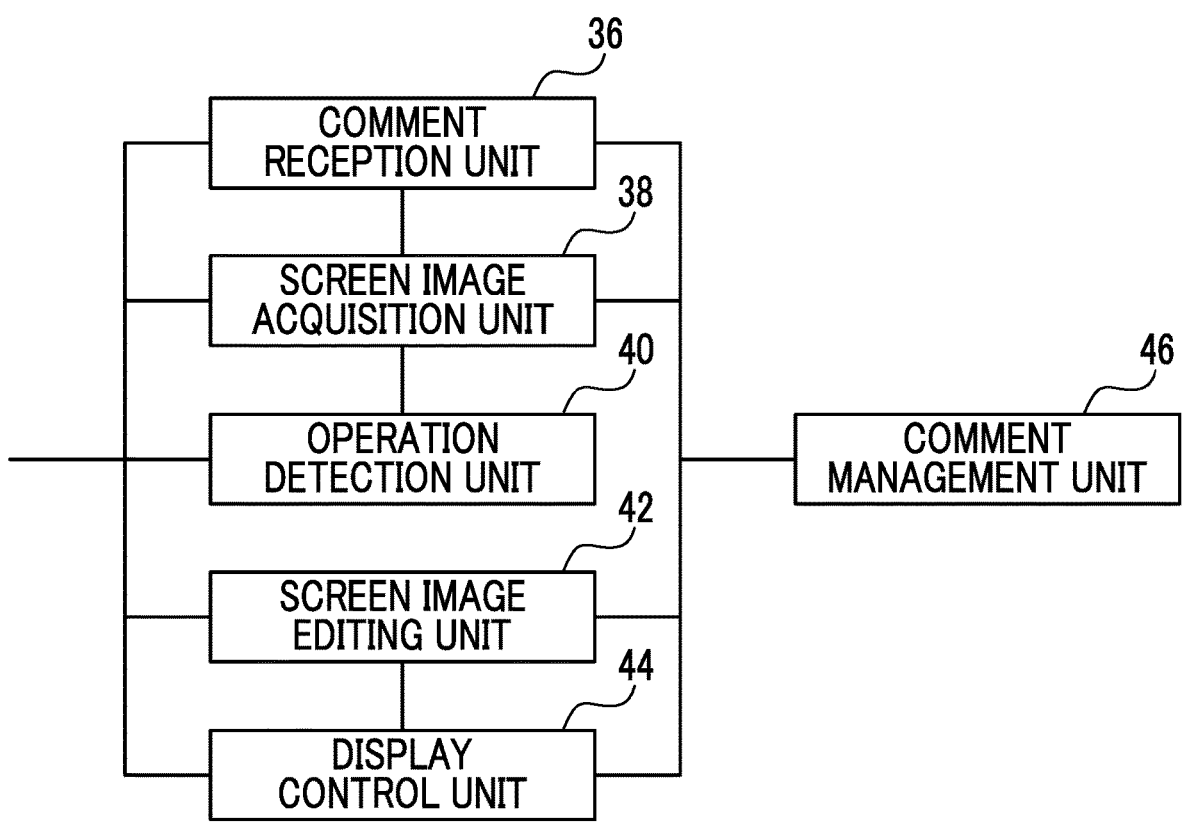
FIG. 3 is a block diagram showing a function of the document management apparatus according to the exemplary embodiment of the invention.

FIG. 3 is a block diagram showing a schematic function of a document management apparatus 10.

The document management apparatus 10 includes a comment reception unit 36, a screen image acquisition unit 38, an operation detection unit 40, a screen image editing unit 42 a display control unit 44, and a comment management unit 46.

The comment reception unit 36 receives a comment input by the user via the input device 20 of the terminal apparatuses 14a and 14b. The screen image acquisition unit 38 acquires a screen image (also referred to as a captured image) displayed on the display device 18 of the terminal apparatuses 14a and 14b. The operation detection unit 40 detects that the user performs operation via the terminal apparatuses 14a and 14b. For example, the operation detection unit 40 detects that the user displays a document on a screen, inputs the comment, or performs scrolling, erasing, or editing. The screen image acquisition unit 38 acquires the screen image in a case where the comment reception unit 36 receives the comment or a case where the operation detection unit 40 detects the operation by the user.

The screen image editing unit 42 receives editing of the screen image acquired by the screen image acquisition unit 38. The display control unit 44 controls to display the document on the display device 18 of the terminal apparatuses 14a and 14b. The comment management unit 46 manages the document stored in the database 24, in association with the comment.

Figure 4:
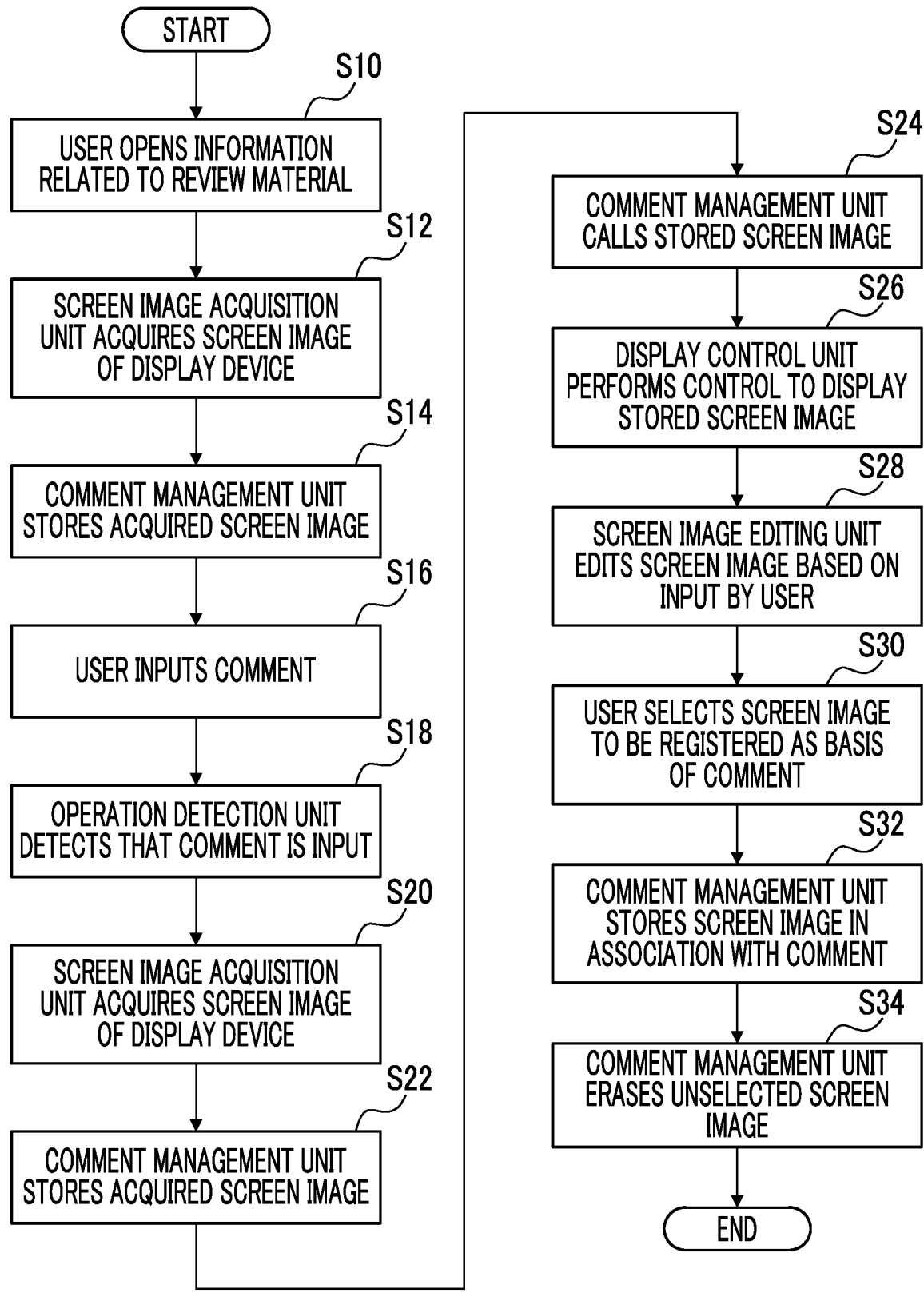
FIG. 4 is a flowchart showing an operating flow of the document management apparatus and an operation flow by a user according to the exemplary embodiment of the invention.

FIG. 4 shows an operating flow of the document management apparatus 10 including the operation by the user. Here, a design material is used as a first document, a specification is used as a second document, and the first document is reviewed with reference to the second document.

Figure 5:
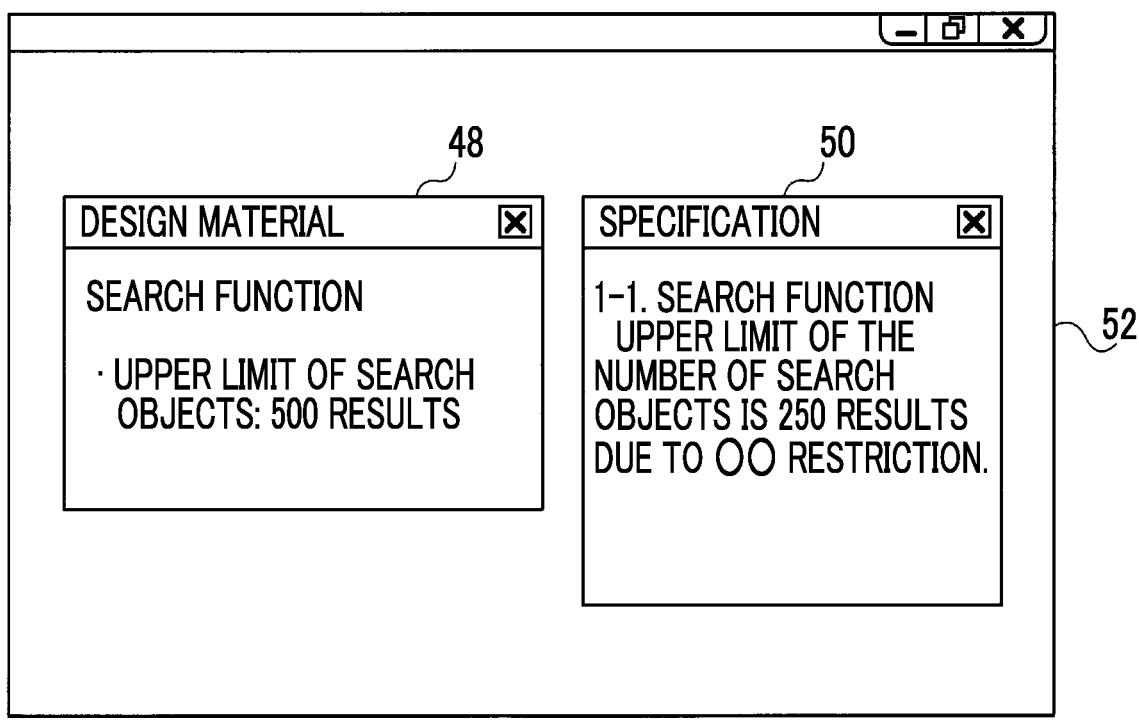
FIG. 5 is a screen diagram in a case where a user opens a review-related material in a document management system according to the exemplary embodiment of the invention.

First, in step S10, the user opens information related to a review material. For example, as shown in FIG. 5, the display control unit 44 displays a first document 48 that is a design material and a second document 50 that is a specification on the display device 18 of the terminal apparatuses 14a and 14b of the user.

As described above, examples of the document include a web page, a source code, and contents communicated via an e-mail or chatting in addition to a formal general document represented by the text.

Figure 6:
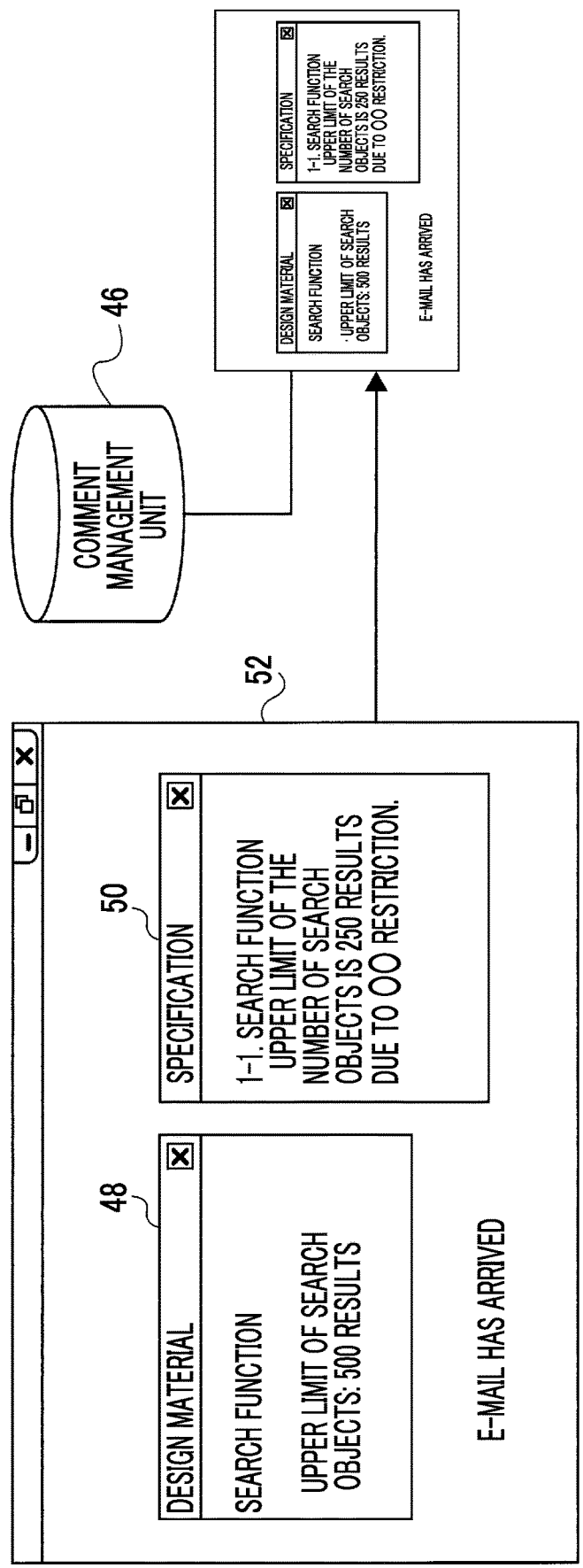
FIG. 6 is a diagram for explaining a screen image and a storage state of a comment management unit in a case where a user opens the review-related material and acquires the screen image in the document management system according to the exemplary embodiment of the invention.

Next, in step S12, as shown in FIG. 6, the screen image acquisition unit 38 acquires a screen image 52 displayed on the display device 18. Here, a part of the first document 48 and a part of the second document 50 are displayed in the screen image 52.

In step S14, as shown in FIG. 6, the comment management unit 46 stores the screen image 52 acquired in step S12.

A notification of the use system such as "e-mail has arrived" may be displayed on the screen image, and in this case, the display of "e-mail has arrived" is also stored as one screen image 52 together with the first document 48 and the second document 50.

Figure 7:
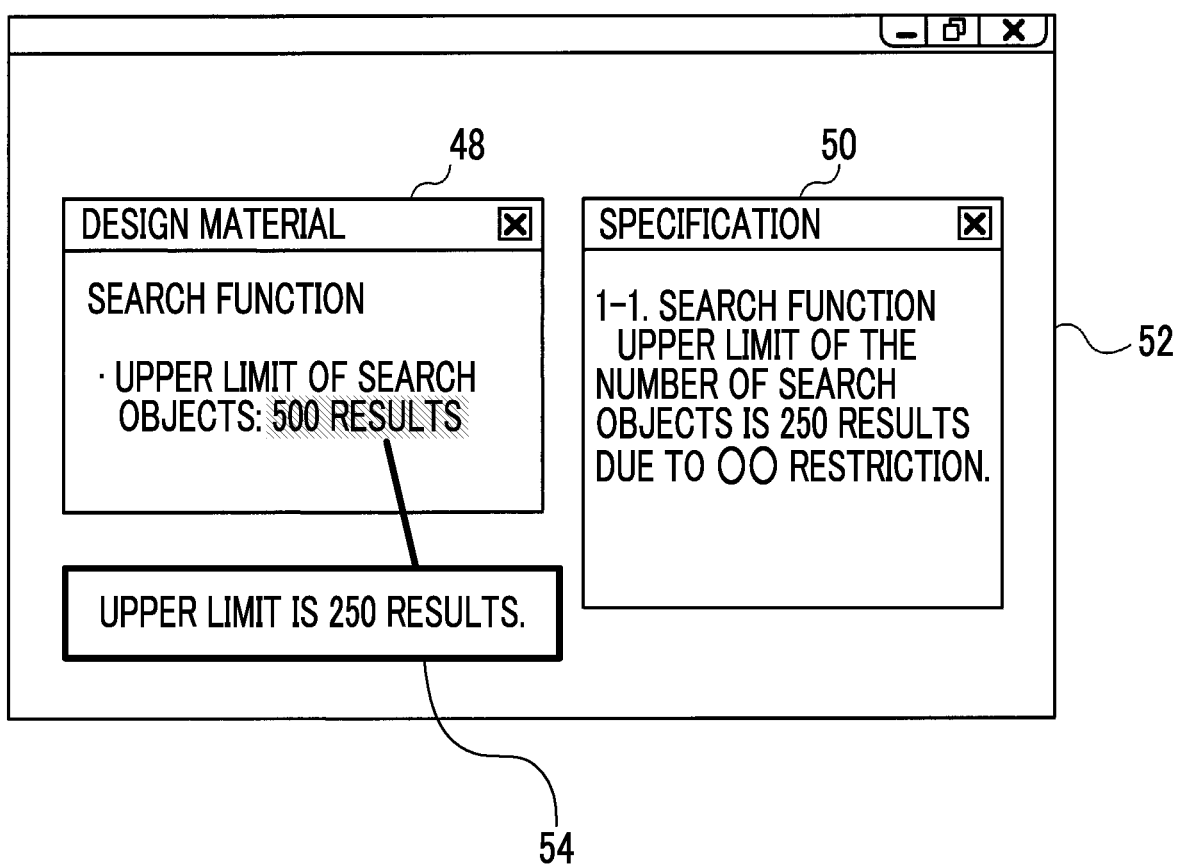
FIG. 7 is a screen diagram in a case where the user inputs a comment in the document management system according to the exemplary embodiment of the invention.

In step S16, as shown in FIG. 7, the user inputs the comment via a comment input unit 54 displayed on the display device 18. Here, the comment "upper limit is 250 results" is input with reference to "250 results" in the second document 50 with respect to "500 results" in the first document 48. In a case where the user inputs the comment, the document management apparatus 10 receives the comment by the comment reception unit 36, and detects that the user performs operation by the operation detection unit 40 in step S18.

Figure 8:
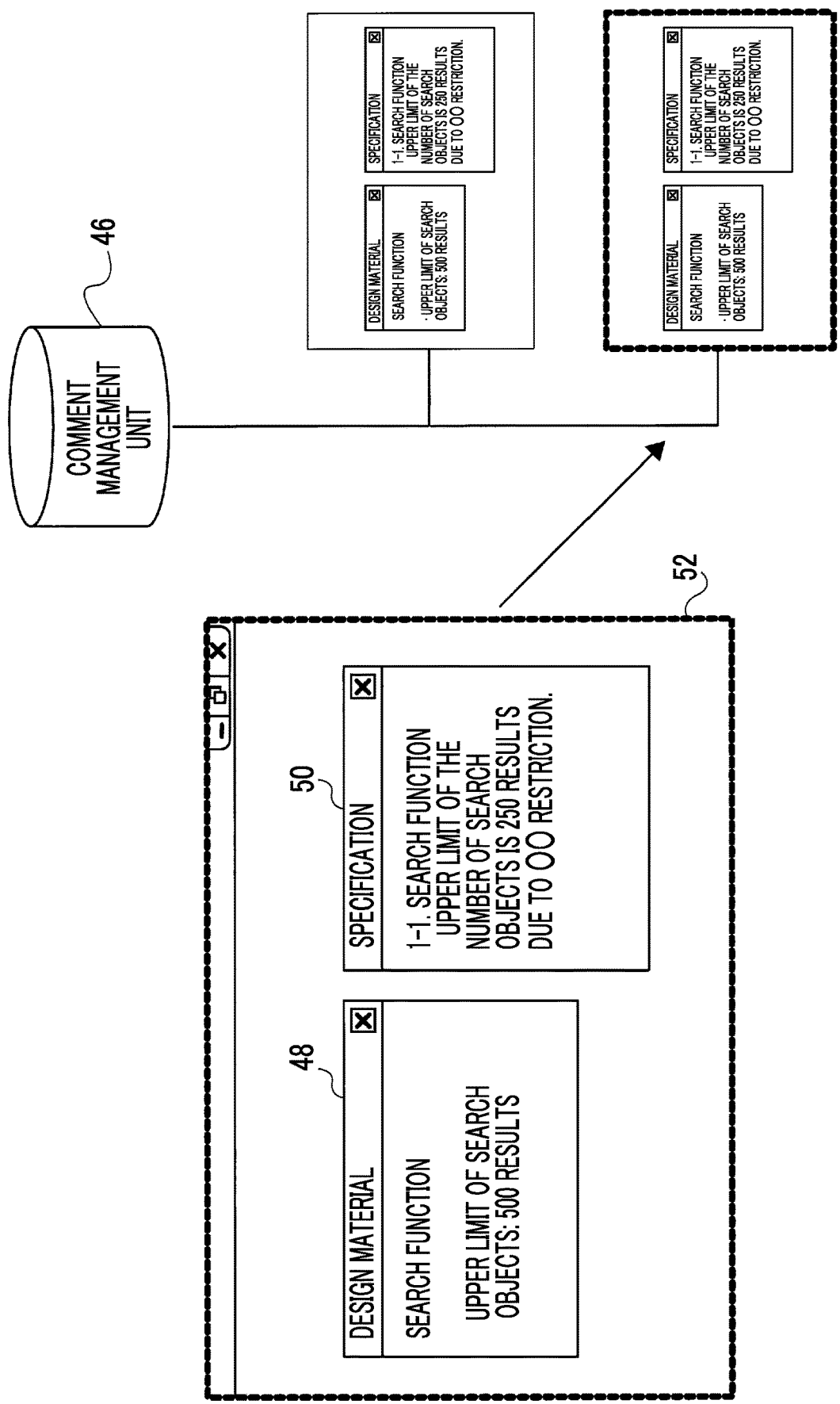
FIG. 8 is a diagram for explaining the screen image and the storage state of the comment management unit in a case where the user inputs the comment and acquires the screen image in the document management system according to the exemplary embodiment of the invention.

In step S20, the screen image acquisition unit 38 acquires the screen image displayed on the display device 18. Next, in step S22, as shown in FIG. 8, the comment management unit 46 stores the screen image 52 acquired in step S20.

Figure 9:
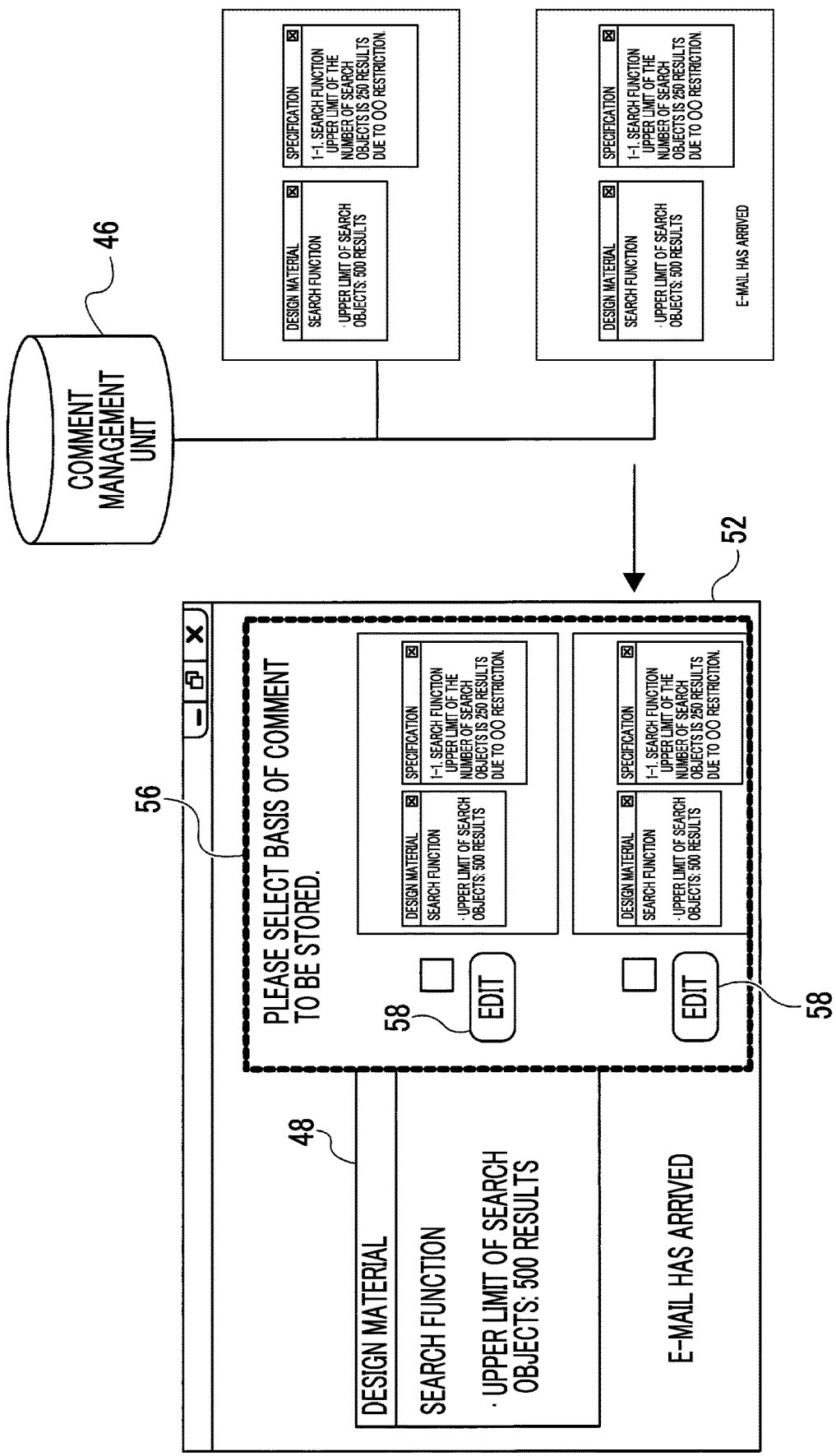
FIG. 9 is a diagram for explaining the screen image and the storage state of the comment management unit in a case where the stored screen image is called and displayed on a display device in the document management system according to the exemplary embodiment of the invention.

In step S24, the comment management unit 46 calls the stored screen image 52. Here, the comment management unit 46 calls the screen image 52 stored in step S14 and the screen image 52 stored in step S22. In step S26, as shown in FIG. 9, the display control unit 44 controls to display the screen image stored in the display device 18. The display control unit 44 controls to display an operation screen 56 for selection on the display device 18. The operation screen 56 for selection displays all the stored screen images such that the stored screen images can be selected.

Figure 10:
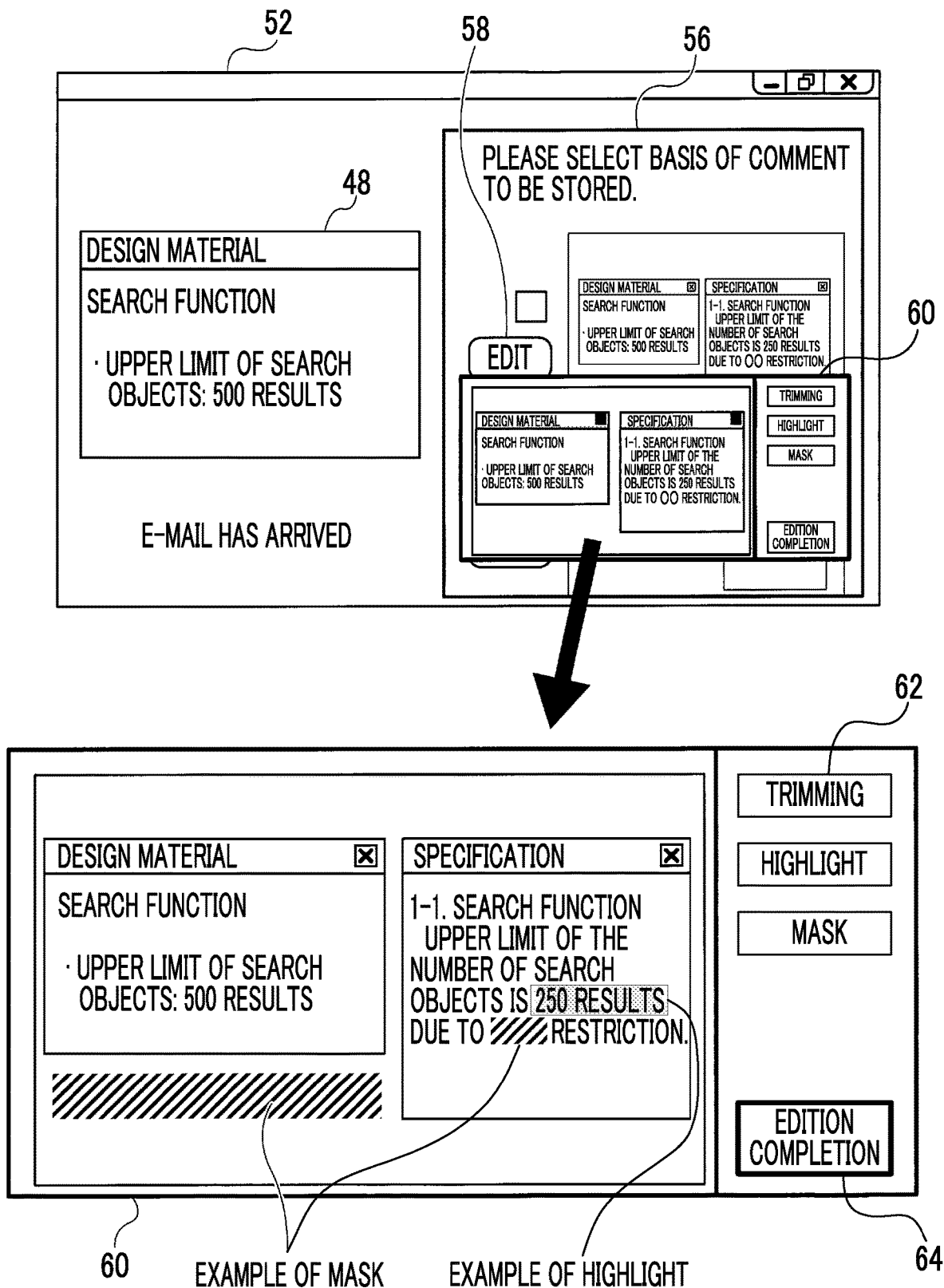
FIG. 10 is a screen diagram in a case where the screen image is edited in the document management system according to the exemplary embodiment of the invention.

An editing button 58 is displayed on the operation screen 56 for selection. The user presses the editing button 58, whereby the screen image editing unit 42 edits the screen image based on input by the user in step S28. In a case where the editing button 58 is pressed, an editing screen 60 is displayed as shown in FIG. 10. On the editing screen 60, operation buttons 62 such as "trimming", "highlight", and "mask" are displayed together with an editing completion button 64. The user designates a part to be operated and presses the operation button 62 to edit the screen image. For example, a part "oo" and a part "e-mail has arrived" are masked and hidden, and a part "250 results" in the second document 50 that is the basis of the comment is highlighted and emphasized. In a case where the editing completion button 64 is pressed, editing is completed.

Figure 11:
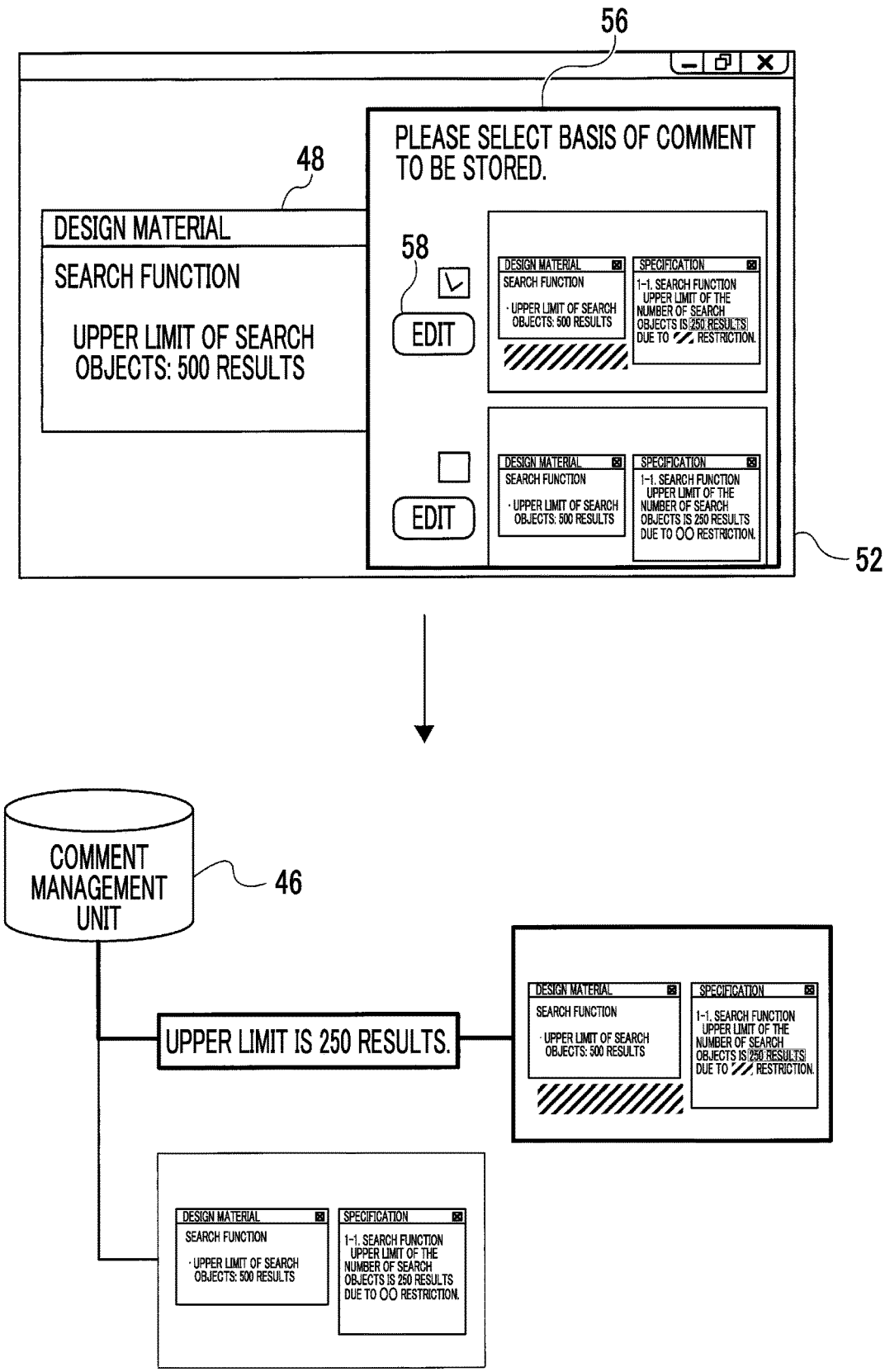
FIG. 11 is a diagram for explaining the screen image and the storage state of the comment management unit in a case where the user selects the screen image in the document management system according to the exemplary embodiment of the invention.

In step S30, as shown in FIG. 11, the user selects the screen image to be registered as the basis of the comment by, for example, checking. Although one screen image is selected here, a plurality of the screen images may be selected. In step S30, the user selects the screen image, whereby the comment management unit 46 associates the comment with the selected screen image in step S32.

In the exemplary embodiment of the invention, the screen image is selected in step S30 after editing in step S28, but conversely, after the screen image is selected, the selected screen image may be edited.

Figure 12:
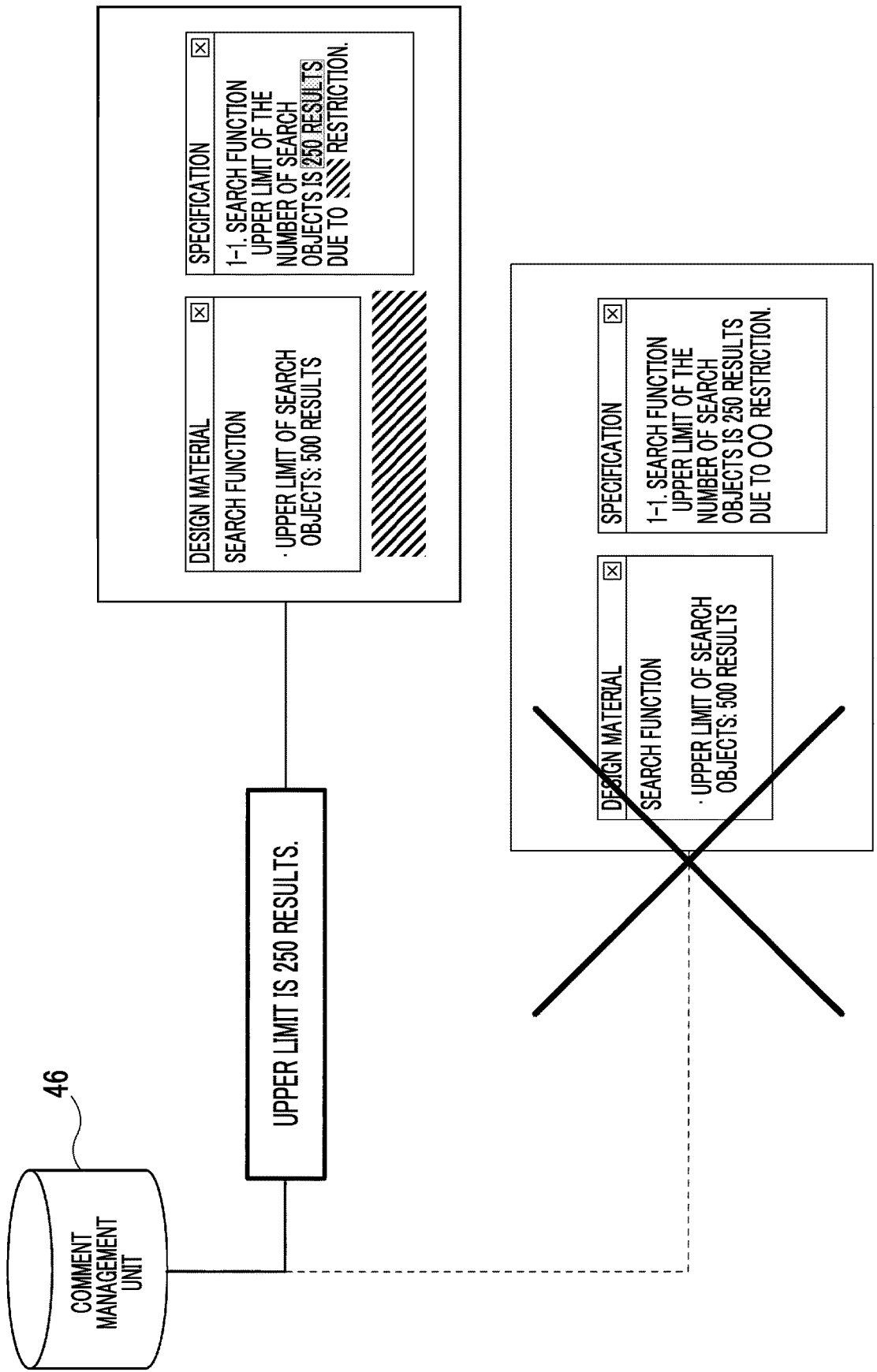
FIG. 12 is a diagram for explaining the screen image and the storage state of the comment management unit in a case where the user does not select the screen image in the document management system according to the exemplary embodiment of the invention.

In step S34, as shown in FIG. 12, the comment management unit 46 erases the unselected screen image, and the processing ends.

In the exemplary embodiment of the invention, the screen image is acquired in a case where the user opens the first document and the second document and a case where the user inputs the comment, but the operation by the user is not limited thereto and includes a case where the user stops scrolling through the displayed document and a case where the user enlarges and displays the document.

Figure 13:
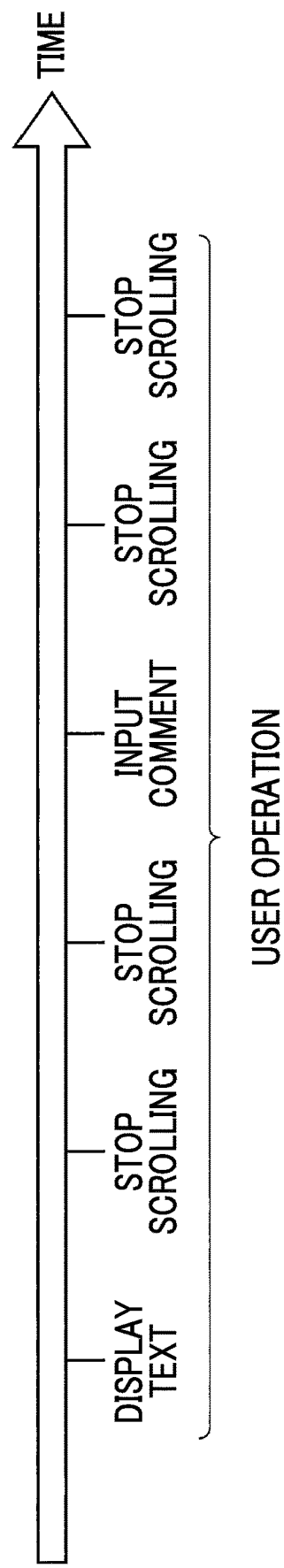
FIG. 13 is a diagram for explaining a relationship between the operation by the user and the screen image acquisition in the document management system according to the exemplary embodiment of the invention.

As shown in FIG. 13, the screen image acquired by a series of operations by the user are stored as one file and the user associates the screen image with the comment in the editing step, but in acquisition of the screen image, the user may associate the screen image with the comment in the comment inputting step, and the screen image may be acquired in a case where the user stops scrolling after the user inputs the comment.

In the exemplary embodiment of the invention, the screen image acquisition unit associates the comment with a part of the document that is the basis of the comment, but the invention is not limited thereto, and for example, an identification (ID; a code for identifying a line) may be added to the second document for each line, and the comment may be associated with the line ID.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document management apparatus comprising:
a processor, configured to:
perform control to display a first document and a second document;
receive a comment inputted by a user to be added to a first designated part of the first document, wherein the comment is inputted by the user by referencing the second document;
associate a second designated part of the second document with the comment to be added to the first designated part of the first comment, wherein the second designated part of the second document is a part that is referenced by the user for inputting the comment;
acquire a screen image in which an image including the first designated part of the first document and an image including the second designated part of the second document; and
display the screen image with the second designated part of the second document being highlighted.

2. The document management apparatus according to claim 1,
wherein the processor associates the screen image with the comment.

3. The document management apparatus according to claim 1,
wherein the processor acquires the screen image when the user operates a screen.

4. The document management apparatus according to claim 1,
wherein the processor acquires the screen image when receiving the comment.

5. The document management apparatus according to claim 1, wherein the processor is further configured to:
receive editing of the screen image.

6. The document management apparatus according to claim 1, wherein the processor is further configured to:
set the screen image without the second designated part of the second document being highlighted as a first screen image;
set the screen image with the second designated part of the second document being highlighted as a second screen image
register one of the first screen image and the second screen image as a basis of the comment according to user designation.

7. The document management apparatus according to claim 1, wherein the processor is further configured to:
display the screen image with a region being masked.

8. A document management system comprising:
a display device that displays a document; and
a document management apparatus that manages the document,
wherein the document management apparatus includes a processor configured to:
perform control to display a first document and a second document on the display device,
receive a comment inputted by a user to be added to a first designated part of the first document, wherein the comment is inputted by the user by referencing the second document;
associate a second designated part of the second document with the comment to be added to the first designated part of the first comment, wherein the second designated part of the second document is a part that is referenced by the user for inputting the comment;
acquire a screen image in which an image including the first designated part of the first document and an image including the second designated part of the second document; and
display the screen image with the second designated part of the second document being highlighted.

9. A non-transitory computer readable medium storing a program causing a computer to execute:
performing control to display a first document and a second document;
receiving a comment inputted by a user to be added to a first designated part of the first document, wherein the comment is inputted by the user by referencing the second document;
associating a second designated part of the second document with the comment to be added to the first designated part of the first comment, wherein the second designated part of the second document is a part that is referenced by the user for inputting the comment;
acquiring a screen image in which an image including the part of the first document and an image including the part of the second document; and
displaying the screen image with the second designated part of the second document being highlighted.

* * * * *